March 23, 1937. E. A. TAYLOR ET AL Re. 20,310

AVERAGE TEMPERATURE CONTROL MECHANISM FOR HEATING SYSTEMS

Original Filed Jan. 8, 1932 3 Sheets-Sheet 1

Inventors
Elbert A. Taylor
Millard D. Pence
and Clayton A. Dunham
By Barnett & Truman
Attorneys.

March 23, 1937. E. A. TAYLOR ET AL Re. 20,310
AVERAGE TEMPERATURE CONTROL MECHANISM FOR HEATING SYSTEMS
Original Filed Jan. 8, 1932 3 Sheets-Sheet 2
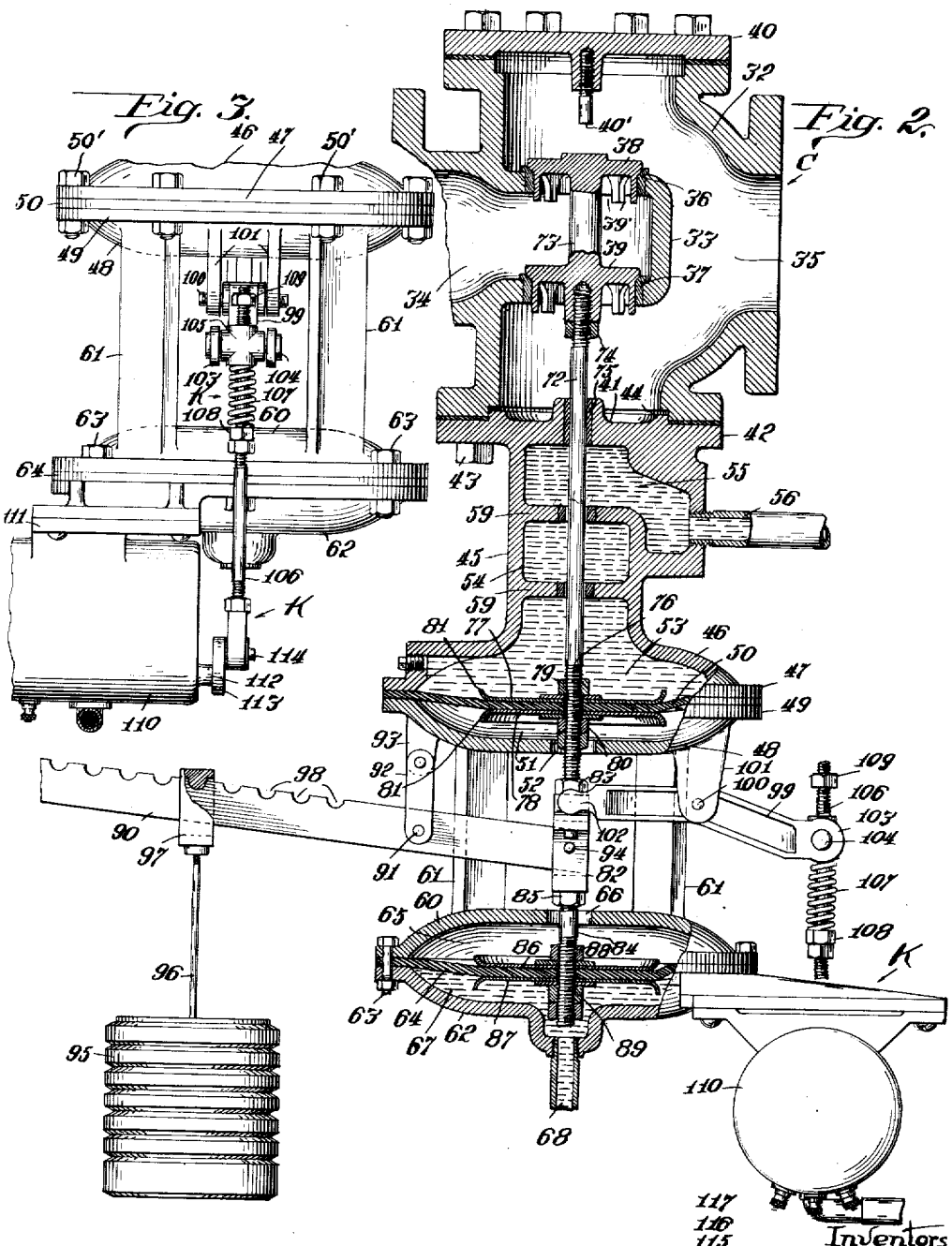
Inventors
Elbert A. Taylor
Millard D. Pence
and Clayton A. Dunham
By Barrett & Truman
Attorneys March 23, 1937. E. A. TAYLOR ET AL Re. 20,310
AVERAGE TEMPERATURE CONTROL MECHANISM FOR HEATING SYSTEMS
Original Filed Jan. 8, 1932 3 Sheets-Sheet 3
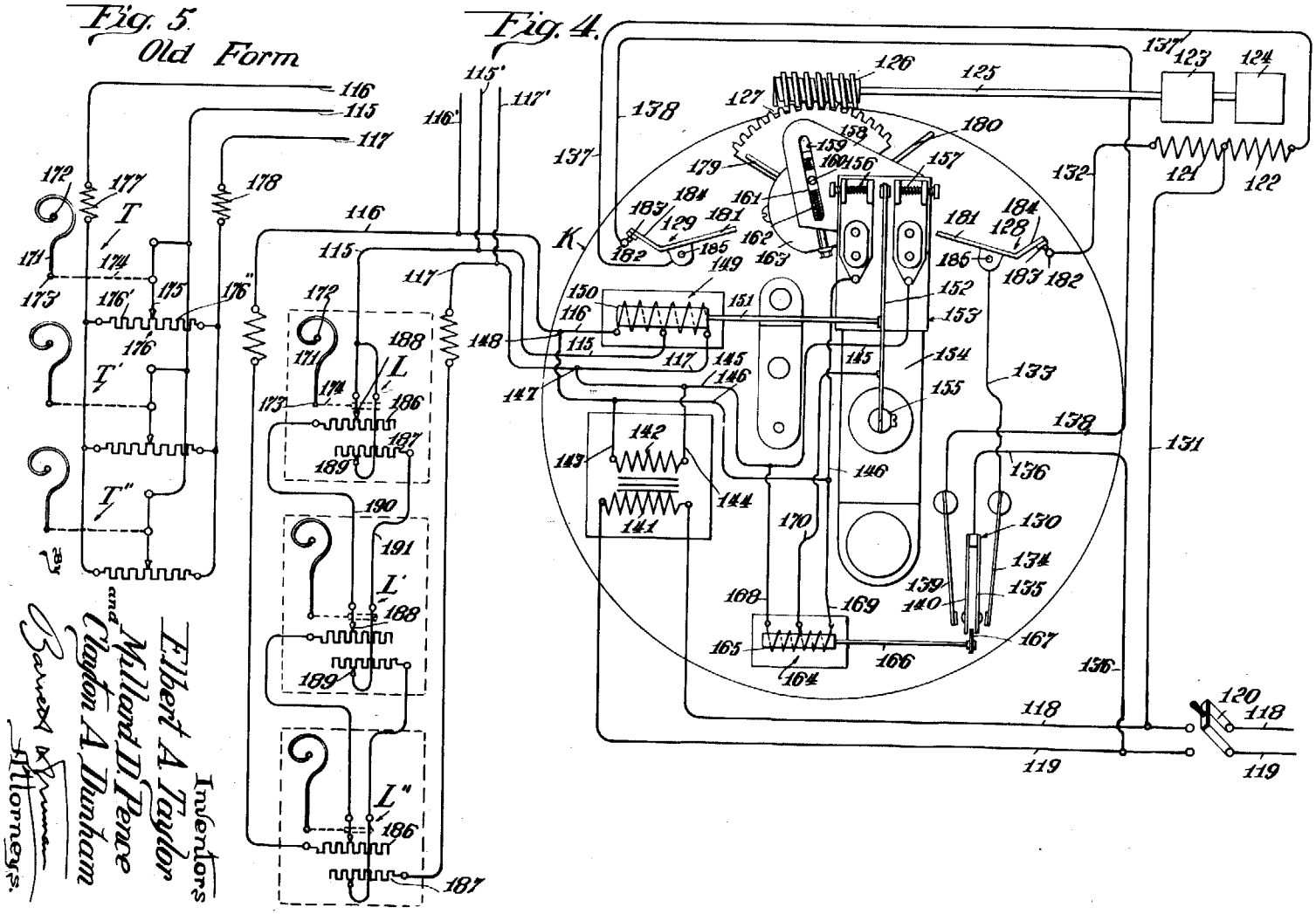

Reissued Mar. 23, 1937 Re. 20,310

UNITED STATES PATENT OFFICE 20,310

AVERAGE TEMPERATURE CONTROL MECHANISM FOR HEATING SYSTEMS

Elbert A. Taylor, Arlington Heights, Ill., Millard D. Pence, New York, N. Y., and Clayton A. Dunham, Glencoe, Ill., assignors to C. A. Dunham Company, Marshalltown, Iowa, a corporation of Iowa Original No. 1,921,172, dated August 8, 1933, Serial No. 585,530, January 8, 1932. Application for reissue February 21, 1935, Serial No. 7,640

11 Claims. (Cl. 236—74)

This invention relates to a new and improved average temperature control mechanism for heating systems and more particularly to an improved thermostatically controlled apparatus by means of which the supply of steam to a steam heating system is automatically controlled in proportion to variations from a predetermined temperature, the controlling temperature at any instant being the average of the temperatures then existing at a plurality of different locations, that is to say three or more locations, in the space heated by the system.

More specifically, the heating system which is preferably of the sub-atmospheric type provided with a differential pressure control of the steam supply to the radiators, is also provided with an electrically-operated motor control of the supply valve whereby the opening of the valve is controlled in proportion to the variations from a certain predetermined temperature. This controlling temperature is determined by a plurality of separate thermostats positioned in various locations in the space to be heated. By plurality of thermostats, as the term is used herein, is intended three or more. In some installations heretofore known involving the use of a plurality of separate thermostats, the connections have been such that each thermostat separately controlled the steam supply valve, so that each one of the thermostats would have to be separately satisfied before the valve could be automatically adjusted. In other words, the desired minimum or maximum temperature would have to be attained at the location of each one of the thermostats. In another known arrangement, involving a proportionate control of the valve, the thermostats have been connected in parallel with the intention of controlling the valve in response to the average of the temperatures registered by the several different thermostats. This latter arrangement has proved ineffective where three thermostats are connected in parallel due to the fact that when two of the thermostats are subject to extreme temperatures in opposite directions, the apparatus will respond to a fixed intermediate temperature regardless of the operative position of the third thermostat. Similar results are obtained when more than three thermostats are used.

According to the present invention, the plurality of separate thermostats are connected in series, the variable resistances controlled by the thermostats being modified in a manner to permit this series connection, all as hereinafter explained in detail. As a result the steam control valve will be regulated in response to the average of the several temperatures to which the different thermostats are subjected, regardless of the positions of any one or more of these thermostats.

The principal object of this invention is to provide an improved average temperature controlling mechanism for heating systems, such as briefly referred to hereinabove and disclosed more in detail in the specifications which follow.

Another object is to provide an improved form of thermostatic control mechanism for a heating system.

Another object is to provide an improved system of connecting thermostatically controlled mechanisms in series so that the effective controlling temperature will be an average of the temperatures registered by the several thermostats of the series.

Other objects and advantages of this invention will be more apparent from the following detailed description of one approved form of apparatus constructed and operating according to the principles of this invention.

In the accompanying drawings:

Fig. 2 is a central vertical section through the reducing valve, partially broken away.

Fig. 3 is a partial side elevation of the valve-controlling mechanism, looking from the right at the lower portion of the apparatus shown in Fig. 2.

Fig. 4 is a wiring diagram for the thermostatic and electrical-controlling apparatus.

Fig. 5 is a wiring diagram, corresponding to the left-hand portion of Fig. 4, showing an old or known form of control mechanism, and disadvantages of which are eliminated by the improved construction shown in Fig. 4.

Figure 1:
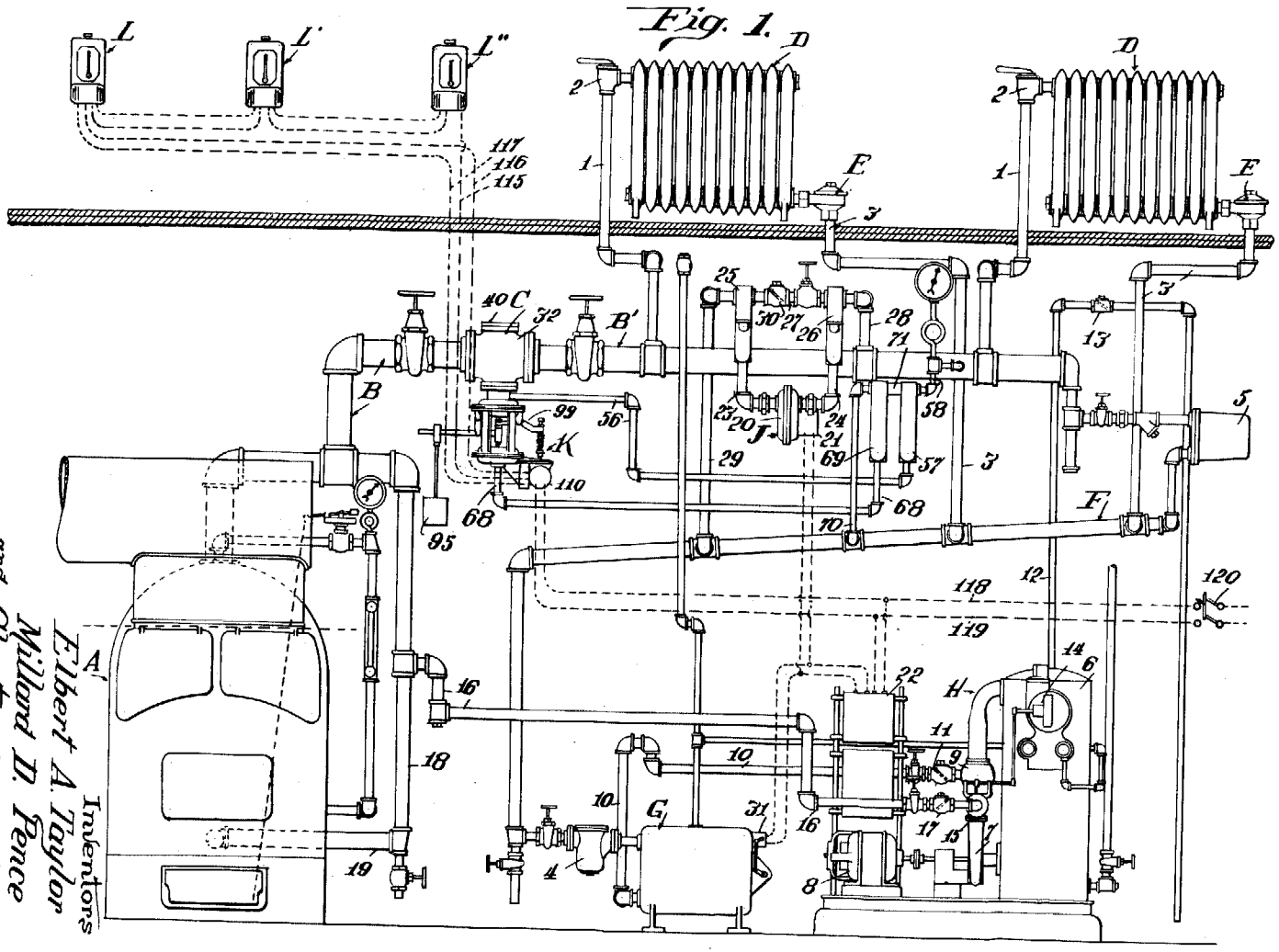
Fig. 1 is a diagrammatic elevation of a steam heating system with the improved controlling mechanism applied thereto.

Reference will first be made to Fig. 1 which shows a heating system of the type with which the improved controlling mechanism is best adapted to cooperate, although this improved controlling mechanism may be used with other types of heating systems as will be hereinafter apparent. The heating system here shown is of the sub-atmospheric steam heating type disclosed in the patent to Clayton A. Dunham 1,644,114, granted October 4, 1927, and in the copending application of David N. Crosthwait, Jr., Serial No. 425,681, filed February 3, 1930. This heating system comprises a boiler or generator A from which the steam flows through supply main B and the improved flow control valve C into the portion B' of the supply main from which the radiators D are supplied. At the outlets of the radiators are steam traps E, F is the return main, G is an accumulator tank for the condensate, the exhausting mechanism is indicated generally at H, and J is the differential pressure controller for the exhausting mechanism. At K is indicated generally an electric controlling mechanism for the valve C, this mechanism K being under the control of a plurality of separate thermostatic devices indicated at L, L' and L''. The present invention is concerned particularly with improvements in the mechanism K and the thermostats L, in combination with the elements with which these parts cooperate.

The controlled seam in main B' passes through risers 1 and inlet valves 2 into the respective radiators D. Suitable orifice plates, such as disclosed in the Dunham patent hereinabove referred to, may be interposed in the respective risers 1, preferably between the inlet valves 2 and the radiators for proportioning the steam flows to the respective radiators in accordance with the size or condensing capacity thereof. The steam traps E are adapted to close when the radiators are filled with steam and prevent the escape of steam therefrom. When condensate and non-condensable gases accumulate in the radiators, the traps E will open and permit the condensate and non-condensable gases to flow out or to be drawn out by the lower pressure maintained in the return side of the heating system. These gases and the condensate flow through pipes 3 into return main F and thence through the strainer 4 into the accumulator tank G. In a similar manner, the condensate and gases accumulating in the portion B' of the supply main pass out through float and thermostatic trap 5 into return main F and thence into the accumulator tank G. The exhausting mechanism H comprises a separator tank 6 and a pump 7, driven by motor 8, to withdraw water from the lower portion of tank 6 and force it through ejector 9 and thence back into the upper part of tank 6 together with the gases and condensate which are withdrawn from accumulator tank G through pipe 10 and check-valve 11 into the exhauster casing. The gases are vented from separating tank 6 through pipe 12 provided with outwardly opening check-valve 13. When a certain amount of liquid has accumulated in tank 6, a float-controlled mechanism, indicated generally at 14, operates to open a normally closed valve 15 so that the pump 7 can force a part of the liquid out through pipe 16 provided with check-valve 17, and thence through pipes 18 and 19 into the boiler.

The exhausting mechanism H is operated whenever it is necessary to build up the pressure differential between the supply and discharge sides of the heating system, or whenever it is necessary to transfer accumulated condensate from the accumulator tank G into the separating tank 6. The control mechanism J comprises a differential-pressure controller 20 which automatically opens and closes a switch 21 which operates through starter 22 to control the motor 8. The differential pressure controller comprises a diaphragm subjected on its opposite sides to the pressures existing in the supply and return sides of the heating system. For this purpose control pipes 23 and 24 extend to surge tanks 25 and 26 positioned in the horizontal section 27 of an equalizing pipe extending between the supply and return sides of the heating system, in the example here shown the relatively high pressure end of pipe 27 communicating through pipe 28 with the supply main B', and the relatively low pressure end communicating through pipe 29 with the return main F. A check-valve 30 is positioned in the equalizing pipe 27 between the relatively high pressure surge chamber 26 and the relatively low pressure surge chamber 25. This valve opens toward the high pressure side of the system and will normally remain closed unless for some reason a lower pressure temporarily exists in the supply main than the pressure in the return main, whereupon valve 30 will open to equalize the pressures. This control mechanism J will operate, in a well known manner, to cause the exhausting mechanism to function whenever the pressure differential between the supply and discharge sides of the heating system falls below a predetermined minimum, and to throw the exhausting mechanism out of operation whenever the desired pressure differential has again been established. Also, a float-controlled mechanism in the accumulator tank G (disclosed in detail in the Dunham patent referred to above) acts through switch mechanism 31 to start the operation of exhausting mechanism H whenever a predetermined amount of condensate has accumulated in the tank G.

The improved control valve C will now be described, referring to Figs. 2 and 3 in addition to Fig. 1. This valve comprises a casing 32 having an internal web 33 separating the supply chamber 34 from the relatively low pressure chamber 35. The supply chamber 34 is connected with the supply main B leading from the boiler, and relatively low pressure chamber 35 connects with the portion of the supply main B' from which the radiators are supplied with low pressure steam. The web 33 is formed with the aligned valve seats 36 and 37, with which cooperate respectively the connected and substantially balanced valves 38 and 39. Each of the valves 38 and 39 is preferably of the sleeve type here shown, with the slots or openings 39' in the sleeve walls so designed that the total area of the valve opening will increase by equal increments as the valve is moved upwardly. A removable closure plate 40 permits access to the upper portion of the casing 32. A closure plate 41 covers the opening in the lower portion of casing 32, this closure plate having an outwardly projecting flange 42 secured to the casing by bolts 43, and an upwardly projecting flange 44 to center the plate 41 properly within the opening in the lower portion of the casing. This closure plate 41 is formed integrally with an upward extension 45 of the diaphragm casing member 46. This upper dished diaphragm casing member 46 is formed at its lower edge with an outwardly extending flange 47, and a similar lower diaphragm casing member 48 is formed on its upper edge with an outwardly extending flange 49. The two casing members 46 and 48 are clamped together at opposite sides of an enclosed flexible diaphragm 50 by means of a plurality of bolts 50' passing through the flanges 47 and 48 and the peripheral portion of diaphragm 50. The chamber 51 within lower casing member 48 is open to the atmosphere through central passage 52. The chamber 53 above the diaphragm 50 is connected through intermediate chamber 54 with an upper chamber 55 from which leads a pipe 56 which leads to a surge chamber 57 communicating through pipe 58 with the supply main B'. The chambers 53, 54 and 55 are all at substantially the same pressure, but the intermediate webs or baffles 59 are designed to prevent the formation of convection currents in the liquid that accumulates above the diaphragm and thus prevent undue heating of the diaphragm 50 from the steam passing through casing 32. The upper portion 60 of a lower diaphragm casing is supported from the lower portion 48 of the upper diaphragm casing by means of a plurality of struts 61. The lower member 62 of this lower diaphragm casing is clamped to the casing member 60 by means of a plurality of bolts 63 so as to enclose a second flexible diaphragm 64 similar to the first described diaphragm 50. The chamber 65 above diaphragm 64 is open to the atmosphere through central passage 66. The lower diaphragm chamber 67 is connected through pipe 68 with a surge chamber 69 connected through pipe 10 with return main F. The surge chambers 57 and 69 may be conveniently positioned adjacent one another and connected by the supporting member 7, although there is no fluid connection between these two chambers.

Referring now again to Figs. 2 and 3, the upper end of a valve stem 72 is threaded in valve structure 73 and provided with a lock nut 74. The valve stem 72 is slidable through a guide bearing 75 in the closure plate 41 and also passes vertically downward through central passages in the webs 59. The lower threaded portion 76 of stem 72 passes through diaphragm 50 and is sealed thereto by means of the diaphragm plates 77 and 78 held in place by nuts 79 and 80. The outer edges of the diaphragm plates are preferably curved, as indicated at 81, to prevent any cutting action on the diaphragm as it is flexed. The lower end of the stem is screwed into the yoke 82 and locked in place by nut 83. A lower valve stem 84 is similarly threaded into the lower side of yoke 82 and locked in place by nut 85. This valve stem 84 is sealed into the lower diaphragm 64 by means of diaphragm plates 86 and 87, held in place by nuts 88 and 89, in the same manner as the upper valve stem is attached to the upper diaphragm.

A lever 90 is intermediately pivoted at 91 to the lower end of a fulcrum link 92 suspended from lug 93 on the lower diaphragm casing member 48. One end of lever 90 is pivoted at 94 within the yoke 82. The other arm of lever 90 carries a weight 95 carried by stem 96 and yoke 97 adapted to rest in any one of a plurality of notches 98 spaced lengthwise of the longer arm of lever 90. It will be apparent that by adjusting the weight 95 outwardly on the lever arm 90, the upward pressure exerted on the movable valve assembly will be increased.

A stop screw 40' mounted in the bottom of closure plate 40 limits the upward movement of valve assembly 73.

It will be noted that opposed sides of the two connected diaphragms 50 and 64 are exposed to atmospheric pressure, but the upper side of the upper diaphragm 50 is subject to the pressure in the supply side of the heating system, whereas the lower side of lower diaphragm 64 is subject to the pressure in the return side of the heating system. Therefore, the net force tending to move the valve assembly downwardly to close the valve is always equal to the pressure differential between the supply and return sides of the system. It will now be apparent that when this downward force exerted by the pressure differential just equals the upward force exerted by the adjustable weight 95, the valves will be in a state of rest or equilibrium. If the pressure differential increases above this fixed normal there will be a tendency to overcome the effect of weight 95 and close the valves. On the other hand, if the pressure differential decreases, the weight 95 will overcome the fluid pressure and open the valves.

In case the valves 38 and 39 are absolutely balanced, that is of equal size, the device will operate as above described. In case a semi-balanced valve assembly is used, the varying pressure effect may be compensated for by employing larger diaphragm plates on one of the diaphragms than the diaphragm plates used on the other diaphragm. This will change the effective area of the flexible diaphragms and compensate for the unbalanced areas of the two valves. The unbalanced pressure due to the difference in elevation between the two diaphragms 50 and 64 may be compensated for by a proper variation in the relative size of diaphragm plates 77, 78 and 86, 87.

In the general operation of the heating system as thus far described, the desired steam pressure in the boiler A and supply pipe B is obtained by proper control of the fires beneath the boiler A, or by the dampers or other heat controlling mechanism with which the generator is supplied. The weight 95 is set to respond to a predetermined pressure differential between the supply and return sides of the system, and the differential controller J will be regulated to maintain substantially the same or a somewhat smaller pressure differential. Assuming that the temperature in the building is below that at which the thermostats L (hereinafter described) operate to close the valve C, and that the system is not yet filled with steam, the weight 95 will operate to open the valves 38 and 39 and permit a free flow of steam through the valve C. The exhausting mechanism H will now be in operation to lower the pressure in the return main, and this exhausting action will extend throughout the system since the traps E are now open. The traps will remain open until the radiators D are filled with steam, and during this time the exhausting mechanism will be unable to establish any material pressure differential between the supply and return mains. When the steam fills the radiators D and reaches the traps E, the traps will automatically close, after which the exhausting mechanism H will be able to establish a lower pressure in the return main F than exists in the supply main B'. As this pressure differential reaches the predetermined value it will act on the diaphragms 50 and 64 to overcome the effect of weight 95 and tend to close the valves 38 and 39 thus throttling the flow of steam to the radiators. As the operation of the valve is gradual, the valve in closing will reach a position where the rate of steam supply to the radiators is approximately equal to the rate of steam consumption or condensation in the radiators, so that the differential will remain substantially constant and the valve will tend to remain in a state of rest or equilibrium in that position for feeding steam to the system at the rate at which it is required. If, for any reason, the rate of steam supply should exceed the desired rate of heat emission from the radiators, or that rate at which the radiators will condense steam to compensate for the heat loss from the building, the pressure differential will increase and the valve C will tend to close. The condensing rate of the radiators will then exceed the rate at which steam is being supplied and the supply pressure will drop so that the differential will diminish and the valve C will tend to open again under the influence of weight 95. It will be apparent that any increase in the pressure differential will tend to cause the valve to close and any decrease in the differential will tend to cause it to open, and that the gradual action of the valve in opening and closing between its extreme limits of travel will permit it to reach a position of substantial equilibrium that maintains the steam supply substantially equal to the condensing rate.

It will now be evident that in view of the fact that the valve C will act to maintain the proper differential at all times and that this can only be accomplished when steam is filling the system at the rate that the system is condensing it, the valve C will act to maintain varying steam pressures in the radiating system in accordance with outside temperatures. This will result in the heat emission from the radiators remaining substantially equal to the heat loss from the building.

It is to be noted that in the construction of the improved control valve C no stuffing boxes are required. One side of each of the movable diaphragms 50 and 64 is exposed to the atmosphere, whereas the pressure chambers at the other sides of the respective diaphragms will become filled with liquid so as to prevent the direct contact of steam with the diaphragms, thus effectively sealing the system against the loss of fluid pressure and prolonging the life of the diaphragms by protecting them from the direct action of the gases in the system.

The construction and operation thus far described is substantially the same as that disclosed and claimed in the copending application of David N. Crosthwait, Jr., Serial No. 425,681, filed February 3, 1930.

In addition to the differential pressure controlling mechanism hereinabove described, thermostatic means is provided for automatically closing the valve or limiting its opening movement in accordance with variations from a predetermined average temperature to be maintained throughout the building that is being heated. A plurality of thermostats L, L', L'', etc. are so constructed and coupled together that the average temperatures registered at any instant by the several thermostats will be the temperature which is effective to automatically control the valve C. A motor mechanism indicated generally at K (Fig. 1) is adapted to move an amount proportionate to the variation of this average temperature registered by the several thermostats from a predetermined standard temperature, and thus move or limit the movement of valve C a proportionate amount so as to effect a proper control of the steam supply. The present invention is concerned particularly with an improved construction of the thermostatically operated mechanism whereby the average of the temperatures registered by the several thermostats will always be effective to control the position of valve C.

Referring again to Figs. 1, 2 and 3, an operating lever 99 is intermediately pivoted at 100 between brackets 101 projecting downwardly from the upper diaphragm casing 48. The inner end 102 of the lever is adapted to engage a portion of yoke 82 so that downward movement of this inner arm of lever 99 will positively pull valve stem 72 downwardly to close the valves 38 and 39. However, the inner arm of lever 99 can swing upwardly independently of the yoke 82. In this manner the lever 99 is operable to close the valves or to limit the amount of their opening movements, but the actual opening movement of the valves is under the control of the pressure operated mechanism previously described. A yoke 103 formed at the outer end of lever 99 is pivoted at 104 to a slide block 105 mounted on the operating stem 106. A compression spring 107 surrounds the stem 106 and is confined between block 105 and an adjustable nut 108. At 109 is a stop nut adjustably mounted on the upper end of stem 106 to limit the upward movement of block 105. At 110 is indicated a small motor assembly which is supported by a bracket 111 projecting from the lower portion of the valve assembly. A rotary operating shaft 112 projecting from the motor casing 110 carries at its outer end a crank arm 113 to which the lower end of operating stem 106 is pivotally connected at 114. Operating means are provided within the casing 110 whereby crank arm 113 will be rotated intermittently, in one direction or the other, an amount proportionate to the variation from a certain predetermined temperature as registered by the thermostats positioned at suitable locations throughout the building. This movement will be transmitted through stem 106 and spring 107 to the operating lever 99, which will impart a corresponding closing movement to the valves 38 and 39, or will so position the inner end 102 of lever 99 as to limit or restrict the possible opening movement of these valves.

Referring now more particularly to Fig. 4, the construction and operation of the electrically operated mechanisms L and K will be briefly described. All of the mechanism indicated in the right-hand portion of Fig. 4 may be positioned in or adjacent the casing 110 shown in Figs. 1, 2 and 3 and is connected by the three-wire circuit 115, 116 and 117 with the thermostats L, L' and L''. The main power lines 118 and 119 lead through cut-out switch 120 to the motor assembly K.

At 121 and 122 are indicated the fields of two small electric motors whose armatures 123 and 124 respectively are mounted on shaft 125 carrying the worm 126 which drives the worm wheel 127 which is mounted on or geared to the crank shaft 112 (see Fig. 3) which moves the valve operating lever 99. One motor 123 rotates in one direction, and the other motor 124 operates in the other direction. The actuationg circuits for the motors 123 and 124 include a pair of limit switches 128 and 129, and a reversing switch 130, which elements will be described more in detail hereinafter. The actuating circuit for motor 123 extends from main lead 118 through wire 131, field 121, wire 132, limit switch 128, wire 133, relatively fixed contact 134 and movable contact 135 of the reversing switch 130, and wire 136 to the other main 119. In a similar manner the actuating circuit for motor 124 extends from main 118 through wire 131, field 122, wire 137, limit switch 129, wire 138, fixed contact 139 and movable contact 140 of the reversing switch 130, and thence through wire 136 to the other main 119.

The primary 141 of a transformer is connected between the mains 118 and 119, and the secondary 142 of this transformer is connected through wires 143 and 144 with the circuit wires 145 and 146 which are connected at 147 and 148 respectively with the two outside wires 117 and 116 of the three-wire circuit leading to the thermostats. The inner ends of the wires 116 and 117 are connected to the ends, and the middle wire 115 is connected to the center of a solenoid 149 having a core 150 connected through stem 151 with the movable contact member 152 of a control switch indicated generally at 153. The elements of switch 153 are mounted on a carriage or plate 154 which is pivoted at its lower end to swing about the axis 155. The switch comprises a pair of contacts 156 and 157 in the form of adjustable screws between which moves the contact member 152 so as to alternatively make contact with either of the relatively fixed contacts 156 and 157. The bracket plate 158 carried by switch assembly 153 is formed with a slot 159 in which engages the pin 160. Pin 160 is carried by a block 161 adjustable along a screw 162 carried by the eccentric disk 163 fixed on the axis of worm wheel 127 so as to rotate therewith. By means of screw 162 the pin 160 may be adjusted toward or from the axis of disk 163 so as to vary the angular distance that bracket 158 and switch assembly 153 will be swung about the axis 155 as the disk 163 is rotated.

At 164 is indicated a balanced relay in the form of a solenoid having a core 165 connected by stem 166 with a plate 167 engaging between the movable contacts 135 and 140 of reversing switch 130 so as to move these contact members alternatively into engagement with the relatively fixed contacts 134 and 139. The wire 145, hereinabove referred to, extends to the contact member 157 of switch 153, and the other wire 146 of this circuit extends to the contact member 156. Branch wires 168 and 169 lead from the circuit wires 145 and 146 respectively to the two ends of the solenoid coil of relay 164. The wire 170 connects the central portion of this solenoid to the movable contact member 152 of switch 153. When movable contact 152 is moved into engagement with relatively fixed contact 156 (in the manner hereinafter described) an actuating circuit will be completed through the left-hand half of the solenoid coil 164 as follows: From transformer secondary 142 through wire 144, wire 145, wire 168, coil 164, wire 170, contact 152, contact 156, and wires 146 and 143 back to the transformer. This will pull the core 165 to the left thereby moving contact 140 of switch 130 into engagement with contact 139 and completing the actuating circuit for motor 124. In a similar manner, when movable contact 152 is moved into engagement with contact 157 a circuit will be completed from transformer secondary 142 as follows: Through wires 144, 145, contact 157, contact 152, wire 170, right-hand half of solenoid coil 164, wire 169, and wires 146 and 143 back to the transformer. This will move the core 165 to the right and move contact 135 of switch 130 into engagement with contact 134, thus completing the actuating circuit for motor 123.

We will refer now to the simple form of thermostat indicated diagrammatically at T in Fig. 5. This comprises a coiled thermostatic member 171 of well known type, fixed at one end 172 and having a movable end 173 which swings to the right as the temperature rises and swings to the left as the temperature is lowered. This movable end 173 of the thermostatic member is connected through link 174 with a contact member 175 which is in constant engagement with a resistance 176 and movable between the ends thereof. Assuming for the moment that one of these thermostats such as T is connected with the controlling mechanism K through the three-wire circuit 115, 116 and 117, instead of the series of thermostats L, L' and L'' in Fig. 4, the wires 116 and 117 will be connected with the respective ends of resistance 176 and the middle wire 115 will extend to the movable contact 175.

Assuming that the predetermined temperature for which the mechanism is adjusted exists at the location of thermostat T, the parts will be in the position shown in Fig. 5 with movable contact 175 at the center of resistance 176. It will be noted that a circuit is complete through transformer secondary 142 and the balanced solenoid 149 and resistance 176, which circuit comprises two parallel halves each including one-half of solenoid coil 149 and one of the sections into which resistance 176 is divided by the movable contact member 175. For example, current flows from transformer 142 through wire 143, wire 146, wire 116, portion 176' of resistance 176, contact 175, wire 115, right-hand half of solenoid 149, wire 117, wire 145, and wire 144 back to the transformer. A similar circuit is completed through the other portion 176'' of resistance 176 and the left-hand half of solenoid 149. When the two halves 176' and 176'' of the resistance 176 are equal, as shown in Fig. 5, the current flowing through each half of solenoid 149 will be equal and this solenoid will be balanced so as to hold the core 150 in a central position, with the movable switch contact 152 positioned centrally between and out of contact with the two switch contacts 156 and 157.

Resistances 177 and 178 are positioned in the two thermostat circuits to decrease the current which constantly flows through these circuits.

Assuming now that the temperature at the location of thermostat T rises above the predetermined temperature for which the mechanism is adjusted, the thermostat 171 will expand and move the contact member 175 toward the right-hand end of resistance 176 a distance which is proportionate to the variation from the predetermined temperature. The relative strengths of the two resistance sections 176' and 176'' will be varied in the same proportion, as will be the strengths of the currents flowing through the two halves of solenoid 149. In the present example, the strength of the current in the left-hand half of solenoid 149 will be increased, so as to move the core 150 to the left and swing movable contact 152 of switch 153 into engagement with the relatively fixed contact 156. The arcuate distance through which movable contact 152 is swung will be proportionate to the variation from the predetermined standard temperature at thermostat T. The engagement of contact 152 with contact 156 will complete a circuit through the left-hand half of relay 164 thus moving contact 140 of switch 130 into engagement with contact 139 and completing the actuating circuit for motor 124. This motor will now rotate the worm 126 and worm wheel 127 causing a movement of shaft 112 and crank arm 113 in such a direction as to lower the left-hand end of lever 99 (Fig. 2) and partially close the valves 38 and 39, or limit the possible opening movement of these valves in case the valves have already been closed by the pressure-operated mechanism. At the same time the eccentric disk 163 will be rotated slowly in a counterclockwise direction, this movement causing pin 160 which engages in slot 159 to swing the switch assembly 154 to the left until contact 156 is disengaged from contact 152, thus breaking the circuit through relay 164 and stopping the motor 124. The arcuate extent of this swinging movement of switch bracket 154, and consequently the time during which motor 124 will operate and the distance through which the valves will be moved will depend upon the arcuate distance through which contact member 152 has been moved by means of the balanced solenoid 149 which in turn is proportionate to the variation in temperature from the desired standard. It will thus be seen that the valves 38 and 39 will be closed an amount proportionate to the temperature variation above the desired standard temperature. In an exactly analogous manner, in case the temperature falls below the desired standard, contact 175 will be moved to the left thus causing movable switch member 152 to be moved against relatively fixed switch member 151, thus causing relay 164 to close the circuit through contacts 135 and 134 whereby motor 123 will be energized to rotate the valve operating mechanism in the opposite direction and open the valves, or rather permit them to be opened by the operation of the pressure-diaphragms. In this case the eccentric disk 163 will be rotated in a clockwise direction so as to swing the switch bracket 154 to the right until contact 156 is disengaged from movable contact 152.

By adjusting the pin 160 radially of disk 163 (by means of screw 162) the distance through which the valves will be moved in proportion to any temperature variation can be adjusted. In case pin 160 is positioned substantially coaxial with disk 163, it will be noted that no swinging movement of switch assembly 153 will result from the rotation of the eccentric disk. In such case the motor 123 or 124, as the case may be, would continue to rotate indefinitely, or until the movable contact member 152 is returned to its central position. For this reason the limit switches 128 and 129 are provided. When the mechanism has continued in operation long enough to entirely open or entirely close the valves, one of the arms 179 or 180 fixed to disk 163 will engage the inner arm 181 of the limit switch 129 or 128 as the case may be, thus opening this switch and stopping the motor. In the example here shown, each of these limit switches comprises a fixed contact 182 and a movable contact 183 carried by one arm 184 of a switch lever pivoted centrally at 185. When the arm 179 or 180 engages the inner arm 181 of the switch lever, the movable contact 183 will be swung out of engagement with fixed contact 182 so as to break the circuit. When the pressure is removed from arm 181, the contact 183 swings back into engagement with fixed contact 182.

In the operation as thus far described, only a single thermostat T is used to control the operation of the valve adjusting mechanism. It is often desirable to control the heating system in accordance with the average of the temperatures existing at a plurality of locations in the building. A single thermostat may be subject to sudden and abnormal changes in temperature, resulting from an open window or door for example, and if the heating system were entirely under the control of this single thermostat, the heating system might be controlled in a manner unsuitable for other portions of the building. By locating a plurality of thermostats at different selected positions in the building, and controlling the heating system in accordance with the average of the temperatures existing at any one time at these several locations, the system will be more economically operated and a more constant and dependable temperature condition maintained throughout the building. In an endeavor to achieve this desired result, a plurality of the thermostat mechanisms of the type indicated at T have been hooked up as indicated at T, T′ and T″ in Fig. 5. It will be noted that with such a hook-up, the left-hand portions of the several resistances 176 will be connected in parallel in one of the thermostat circuits, and the right-hand portions will be connected in parallel in the other thermostat circuit. As long as the variations from the standard temperature are small at each of the thermostats, this apparatus will function to control the heating system approximately in accordance with the average of the temperatures at the three thermostats. However, in case the temperature at one thermostat (such as T) falls so that the movable contact 175 is moved substantially to the left-hand end of the resistance 176, and in case another thermostat (for example T″) responded to an excessive temperature such as to move the movable contact to the other end of its resistance, the effective resistances in each of the thermostat circuits will be reduced to a minimum so that solenoid 149 will be balanced and movable switch member 152 held in its central inoperative position. This condition of the parts will persist no matter what the position of the third thermostat may be, or, in case more than three thermostats are so connected, all of the additional thermostats will be ineffective to control the heating system so long as any two of the thermostats are subject to extreme temperature variations in opposite directions.

In order to avoid this failure of the mechanism shown in Fig. 5 to operate under certain conditions which are often met with in the actual operation of the heating system, the improved thermostat construction and thermostat assembly indicated at the left of Fig. 4 have been provided. Each of the similar thermostatic mechanisms L, L′ and L″ is provided with a pair of separate resistances 186 and 187 similar to the single resistance 176 used in thermostat T. Movable contact members 188 and 189 engage the respective resistances 186 and 187 and are simultaneously adjusted lengthwise of these resistances by the movements of thermostatic member 171 in exactly the same manner as hereinbefore described in connection with the thermostat T. When a plurality of thermostats are used, as shown in Fig. 4, for obtaining the true average effect which is the object of this invention, the central wire 115 is connected to the movable contacts 188 and 189 of the thermostat L at one end of the series, and the outside wires 116 and 117 are connected to the opposite ends of the respective resistances 186 and 187 of the thermostat L″ at the opposite end of the series. The left-hand end of resistance 186 of the first thermostat L is connected by wire 190 with the movable contact 188 engaging the similar resistance 186 of the second thermostat L′. The right-hand end of resistance 187 of thermostat L is connected by wire 191 with the movable contact member 189 engaging the resistance 187 of the second thermostat L′. In a similar manner, the resistances of the second thermostat L′ are connected with the movable contact members of the third thermostat L″ and so on throughout the series in case more than three thermostats are used. It will now be seen that in this apparatus the effective portions of the several resistances 186 are all connected in series in one of the thermostat circuits (that is the circuit between wires 115 and 116), and the effective portions of the other resistances 187 are all connected in series in the other thermostat circuit between wires 115 and 117. With such a construction, in case two of the thermostats are subject to extreme high and low temperatures, respectively, and the movable contact members 188 or 189 are moved to extreme positions so as to entirely eliminate in each case one of the resistances 186 or 187 from the circuits, the mechanism will not be rendered inoperative, since so long as any one of the thermostats is intermediately positioned in response to an approximately normal temperature, the resistances of that thermostat will still be effective to control the two thermostat circuits and to vary the position of the balanced solenoid 149. This combination of the thermostatic members will control the heating system in response to an average of the temperatures existing at the locations of the several thermostats, even though two of the thermostats may be temporarily subject to opposite extreme or abnormal temperatures.

The limiting conditions as to the number of thermostats which can be connected in series as shown in Fig. 4 will be determined by the sum of the resistances reaching such a value that the current flowing in the balanced solenoid 149, and hence the flux produced, is so reduced as to be insufficient to cause proper operation of the switch 153. If it is desirable to use more thermostats than this number, a plurality of hook-ups similar to that shown at the left of Fig. 4 can be connected in parallel across the lines 115, 116 and 117. For example, a second series of wires 115', 116' and 117' are shown in Fig. 4 traveling from the wires 115, 116 and 117, respectively. These branch wires will extend to a second group of three thermostats similar to L, L' and L'', and similarly connected. With such an installation the heating system will be controlled in accordance with an average of the average temperatures recorded by each of the two groups of thermostats. In practice it has been found convenient to use 9, 16 or 25 thermostats for large installations. If nine are used, there will be three groups of three thermostats each, the groups being connected in parallel with the solenoid 149, and the thermostats in each group being connected in the manner shown in Fig. 4 for thermostats L, L' and L''. If sixteen thermostats are used, there will be four groups of four thermostats each, and if twenty-five are used there will be five groups of five thermostats each. For such groupings a single standard type of thermostat of fixed resistance can be used and maintain approximately the desired total resistance in the control circuit. However, by suitably varying the resistance in the thermostats, the number of groups and the number of thermostats in each group may be chosen as found to be desirable or necessary.

Referring now briefly to the general operation of this heating system, the production of steam at the generator A will be so regulated as to supply steam at substantially the proper sub-atmospheric pressure to replace the heat loss from the building. The pressure operated controller C will respond to variations in the pressure differential between the supply and return sides of the system so as to maintain the radiators D filled (or partially filled in very mild weather) with steam at a pressure approximately sufficient to replace these heat losses. In case the average temperature produced within the building by means of this heating system exceeds the predetermined desired temperature, the several thermostats L, L' and L'' will cooperate to cause the electrically operated mechanism K to partially close the valve C and cut down the flow of steam to the radiators. The valve C will still be under the control of the differential-pressure operating mechanism, but the maximum opening of the valve C will be limited by the position of control lever 99 which is determined by the action of the thermostatic mechanism. In case the average temperature within the building falls below the desired standard, lever 99 will be automatically adjusted so as to permit a wider opening of the control valve C, and this opening of the valve will be effected by the differential pressure mechanism at such a rate as to maintain the proper efficient supply of steam to the radiators.

We claim:

1. In a temperature control device, the combination of a plurality of control devices each comprising a thermostat, a pair of resistances, a pair of movable contact members one engaging each of the resistances, and means actuated by the thermostat for simultaneously moving the contacts lengthwise of the resistances, a pair of control circuits, the effective portions of all of one set of similar resistances of the several control devices being connected in one circuit, and the effective portions of the other set of resistances being connected in the other circuit, and controlling mechanism governed by the control circuits.

2. In a temperature controlling mechanism, the combination of a plurality of control devices each comprising a thermostat, a pair of resistances, a pair of movable contact members one engaging each resistance, and means actuated by the thermostat for simultaneously moving the contacts lengthwise of the respective resistances, a three-wire controlling circuit in which the control devices are connected so that the effective portions of the similar resistances of all of the control devices are connected in series between the intermediate wire and one side wire of the three-wire circuit, and the effective portions of the other set of resistances are connected in series in the other side of the three-wire circuit, and a controlling mechanism operable by the circuit.

3. In a temperature controlling mechanism, the combination of a plurality of control devices each comprising a thermostat, a pair of resistances, a pair of movable contact members one engaging each resistance, and means actuated by the thermostat for simultaneously moving the contacts lengthwise of the respective resistances, a three-wire controlling circuit, the intermediate wire being connected to the two movable contacts of the control devices at one end of the series, wires connecting the respective ends of the resistances of this first control device to the respective movable contacts engaging the corresponding resistances of the next device of the series, similar wires connecting these latter resistances with the movable contacts of the next device and so on throughout the series, the two outside wires of the controlling circuit being connected to the respective ends of the two resistances of the last device in the series, whereby the effective portions of one set of the resistances of all of the control devices are connected in series in one side of the controlling circuit, and the effective portions of the other set of resistances are connected in series in the other side of the controlling circuit, and a controlling mechanism operable by the controlling circuit.

4. Temperature controlling means for a steam heating system comprising a steam supply valve, means for controlling the setting of the valve in accordance with pressure changes at the low pressure side of the valve, and means for thermostatically controlling the valve in accordance with the average of the temperatures existing at a plurality of locations comprising a motor device for adjusting the valve an amount proportionate to the variation from a predetermined temperature, a pair of control circuits for the motor, one for determining movement in one direction and the other in the other direction, a plurality of temperature control devices each comprising a thermostat, a pair of similar resistances for each thermostat, a contact engaging with each resistance, and means operable by the thermostat for simultaneously moving the contacts lengthwise of the resistances, and connections whereby the effective portions of the similar resistances of all of the control devices are connected in series in one control circuit, and the effective portions of the other set of resistances are connected in series in the other circuit.

5. Temperature controlling means for a steam heating system comprising a steam supply valve, means for controlling the setting of the valve in accordance with pressure changes at the low pressure side of the valve, and means for thermostatically controlling the valve in accordance with the average of the temperatures existing at a plurality of locations comprising a motor device for adjusting the valve an amount proportionate to the variations from a predetermined temperature, a three-wire control circuit for the motor, a plurality of temperature control devices each comprising a thermostat, a pair of similar resistances for each thermostat, a contact engaging with each resistance, and means operable by the thermostat for simultaneously moving the contacts lengthwise of the resistances, and connections whereby the effective portions of the similar resistances of all of the control devices are connected in series between the intermediate wire and one side wire of the three-wire circuit, and the effective portions of the other set of resistances are connected in series in the other side of the circuit.

6. Temperature controlling means for a steam heating system comprising a steam supply valve, pressure-operated means for controlling the setting of the valve in response to pressure changes at the low pressure side of the valve, and thermostatically controlled means for restricting the opening of the valve by the pressure-operated means in proportion to variations from a predetermined average of the temperatures at a plurality of locations, said means comprising a motor device for adjusting the valve an amount proportionate to the variation from the predetermined average temperature, a plurality of temperature control devices each comprising a thermostat, a pair of similar resistances for each thermostat, a contact engaging with each resistance, means operable by the thermostat for simultaneously moving the contacts lengthwise of the resistances, a pair of control circuits for the motor, and connections whereby the effective portions of the similar resistances of all of the control devices are connected in series in one circuit, and the effective portions of the other set of resistances are connected in series in the other circuit.

7. Temperature controlling means for a steam heating system comprising a steam supply valve, pressure-operated means for controlling the setting of the valve in response to pressure changes at the low pressure side of the valve, and thermostatically controlled means for restricting the opening of the valve by the pressure-operated means in proportion to variations from a predetermined average of the temperatures at a plurality of locations, said means comprising a motor device for adjusting the valve an amount proportionate to the variation from the predetermined average temperature, a plurality of temperature control devices each comprising a thermostat, a pair of similar resistances for each thermostat, a contact engaging with each resistance, means operable by the thermostat for simultaneously moving the contacts lengthwise of the resistances, a three-wire control circuit for the motor, and connections whereby the effective portions of the similar resistances of all of the control devices are connected in series between the intermediate wire and one side wire of the circuit, and the effective portions of the other set of resistances are connected in series in the other side of the circuit.

8. In a temperature control device for a steam heating system, the combination of a plurality of control devices each comprising a thermostat and a variable resistance controlled by the thermostat, a motor means and a control circuit for the motor means including the effective resistances of the several control devices, the control devices being divided in groups, the effective resistances of each group being connected in series, and the several groups being connected in parallel in the control circuit.

9. In a temperature control device for a steam heating system, the combination of a plurality of control devices each comprising a thermostat, a pair of resistances, a pair of movable contact members one engaging each of the resistances and means actuated by the thermostat for simultaneously moving the contacts to vary the effective portions of the resistances, a valve controlling mechanism, a pair of similar control circuits for the valve controlling mechanism, the control devices being divided into groups, each of the control circuits being divided into several parallel branch control circuits, one for each group, the effective portions of all of one set of similar resistances of the several control devices in any one group being connected in one branch circuit for that group and the effective portions of the other set of resistances being connected in the other branch circuit for that group.

10. In temperature regulating mechanism the combination of a motor having two controlling circuits; a plurality of resistances connected in series for each circuit; a plurality of thermostats; and means associated with each thermostat for simultaneously cutting resistance into one of the circuits and cutting resistance out of the other circuit.

11. In temperature regulating mechanism for steam heating systems, the combination of a steam supply valve; pressure responsive means for controlling the valve; and temperature responsive means for controlling the valve comprising a motor having two controlling circuits, a plurality of resistances connected in series for each circuit, a plurality of thermostats, and means associated with each thermostat for simultaneously cutting resistance into one of the circuits and cutting resistance out of the other circuit.

ELBERT A. TAYLOR.
MILLARD D. PENCE.
CLAYTON A. DUNHAM.

DISCLAIMER

Re. 20,310.—*Elbert A. Taylor*, Arlington Heights, Ill., *Millard D. Pence*, New York, N. Y., and *Clayton A. Dunham*, Glencoe, Ill. AVERAGE TEMPERATURE CONTROL MECHANISM FOR HEATING SYSTEMS. Patent dated March 23, 1937. Disclaimer filed March 24, 1938, by the assignee, *C. A. Dunham Company*.

Hereby enters this disclaimer to claim 10 of said reissued patent.

[*Official Gazette April 19, 1938.*]